UNITED STATES PATENT OFFICE.

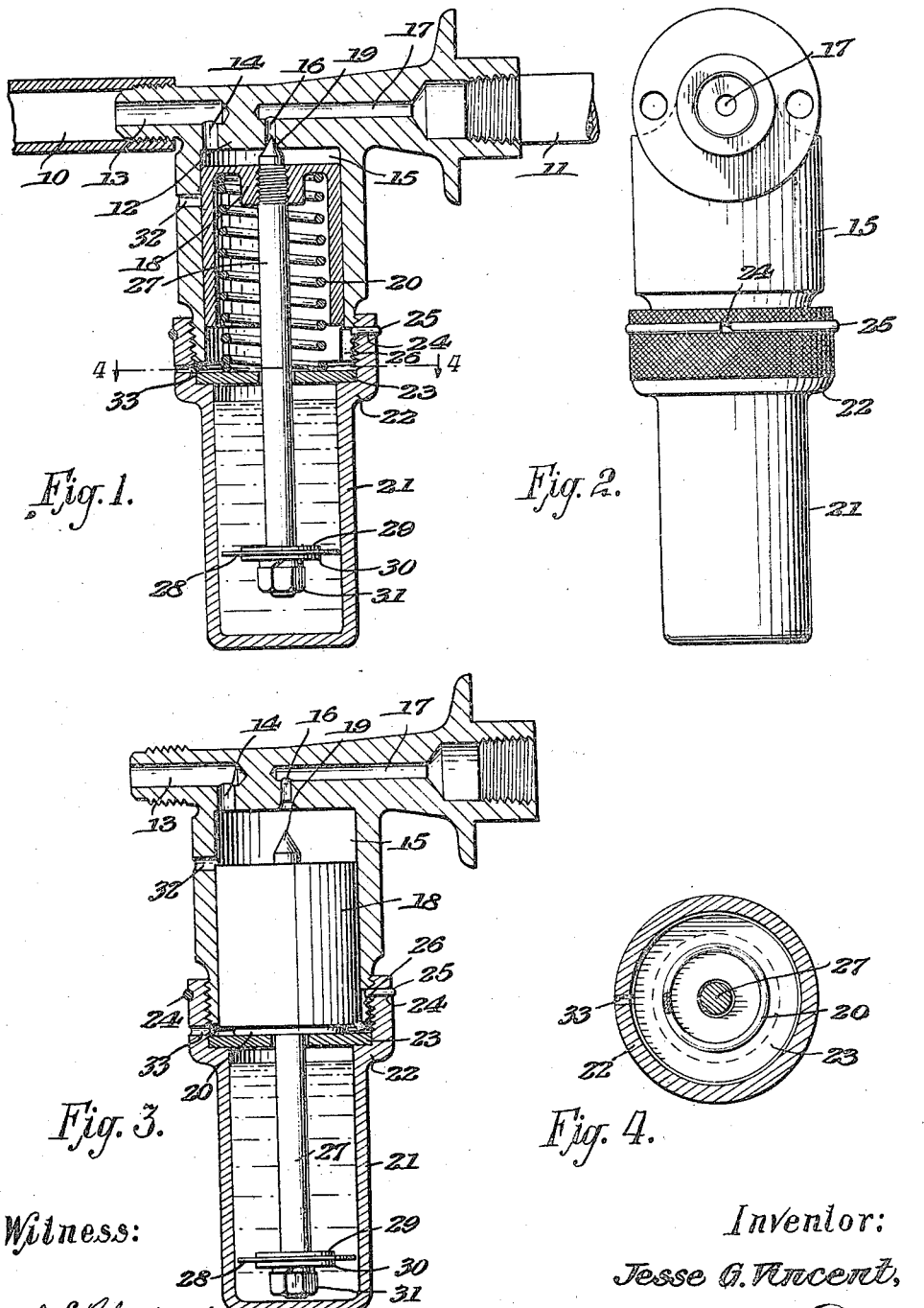

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON-MOTOR.

1,260,487.  Specification of Letters Patent.  Patented Mar. 26, 1918.

Application filed May 17, 1917. Serial No. 169,244.

*To all whom it may concern:*

Be it known that I, JESSE G. VINCENT, a citizen of the United States, and resident of Detroit, Wayne county, State of Michigan, have invented certain new and useful Improvements in Hydrocarbon-Motors, of which the following is a specification.

This invention relates to improvements in hydrocarbon motors and particularly to an improvement in the gasolene pressure relief valve mechanism.

In gasolene supply systems where the fuel is fed under pressure a valve mechanism is provided to sustain the pressure at the gasolene tank and at the same time prevent the air pressure in the system from passing beyond a predetermined limit. One object of this invention is the provision of a pressure control and relief valve mechanism having means to cause it to move slowly and quietly during its operation.

Other objects will appear from the following description taken in connection with the accompanying drawings which form a part of this specification and in which:

Figure 1 is a longitudinal section of a valve mechanism embodying this invention;

Fig. 2 is an elevation of the valve mechanism from the right of Fig. 1;

Fig. 3 is a view partly in section of the valve mechanism and corresponding to Fig. 1, with the valve, however, shown depressed; and Fig. 4 is a section taken on the line 4—4 of Fig. 1 in the direction indicated by the arrows.

In the drawing the reference numerals 10 and 11 designate portions of the gasolene pressure line between which is positioned a pressure control and relief valve mechanism 12. The air in passing from the part 10 to the part 11 travels through the conduits 13 and 14 into the chamber 15 and thence through the conduits 16 and 17 to the part 11.

The pressure under which the air is forced through the system naturally fluctuates and means are provided to sustain the pressure beyond the mechanism 12 by closing the conduit 16 and thus cutting off the escape of the air. The chamber or valve casing 15 is shown cylindrical in form and in it is positioned a valve 18 of the plunger type having projecting from the top a cone shaped tip 19 which, when the valve is in its upper position, enters the mouth of and closes the conduit 16. The valve is normally held in the upper position with the tip 19 seated in the conduit 16 by a spring 20 and is depressed by the air pressure introduced through the conduits 13 and 14.

As pointed out above the air pressure in the system varies and therefore the valve 18 must reciprocate in the casing, opening and closing the conduit 16. The intermittent clicking of metal against metal resulting therefrom is objectionable and in order to obviate it as much as possible a dash pot mechanism is employed.

Detachably secured to the lower end of the valve casing is a dash pot casing 21 provided near the upper end with a shoulder 22 on which rests a plate 23. This plate acts to close the bottom of the chamber 15 and on it is seated the valve spring 20. As shown the upper end of the dash pot casing and the lower end of the valve casing are detachably joined or threaded together and the end of a locking spring 24 enters a hole 25 in the dash pot casing and a slot 26 in the valve casing to hold the two elements in the desired position. By means of this construction the relation of the dash pot casing and valve casing may be adjusted and since the plate 23 which is mounted on the shoulder 22 of the dash pot casing supports the spring 20, the tension of that spring is regulated.

Through an opening in the plate 23 extends a stem 27 which is detachably secured to the valve 18. In the form shown the stem projects above the valve 18 and forms the cone shaped tip 19 referred to above. The lower end of the stem extends into the casing 21 and is provided with one or more washers 28, substantially the size of the interior of the casing, mounted between the plates 29 and 30 and held in place by the nut 31 threaded on the stem. The casing is of course filled with any suitable fluid and since it is below the valve casing 15 the fluid does not leak into the valve casing and hence it is not necessary to seal the dash pot casing. The dash pot thus constructed opposes any reciprocation of the valve 18 and thus quiets the closing of the conduit 16 by the valve tip 19.

At one side of the chamber 15 is a port or opening 32 which is covered and uncovered by the valve 18. This port is in the nature of a relief port so that when the air pressure exceeds a predetermined amount the valve 18 has been depressed until it uncovers the port 32 and permits air to escape and the air pressure to be reduced.

In the upper part of the casing 21 sufficiently above the shoulder 22 so as not to be blocked by the plate 23 is a port 33. The casing 15 does not reach the port 33 which is always open and prevents the formation of any air pressure which might offer resistance to the depression of the valve 18.

The valve mechanism operates in the following manner. An air pump (not shown) forces air through the part 10, the conduits 13 and 14 into the chamber 15. The air being under pressure depresses the valve 18 against the action of the spring 20. When the valve is depressed the stem 27 is also lowered so that the cone shaped tip 19 is drawn away from the mouth of the conduit 16 and the air passes on through that conduit and conduit 17 to the part 11 and the supply tank. The position of the valve 18 and the tip 19 depends therefore on the amount of pressure exerted in feeding the air. When the pressure reaches a predetermined limit the valve will have been depressed so far as to uncover the opening 32 and the air will escape until the pressure is sufficiently reduced. The air pressure in the system fluctuates constantly and the result is that there will be quite a little clicking of metal against metal when the tip 19 closes the conduit 16. In order to quiet this noise and to prevent a too sudden closing of the conduit 16 the dash pot above referred to is employed.

While one embodiment only of this invention has been shown and described it will be obvious that other embodiments may be made which fall within the scope of this invention as set forth in the following claims.

Having thus described my invention, what I claim and desire to secure by Letters Patent is:—

1. In a hydrocarbon motor, in combination, a gasolene pressure relief valve, and a dash pot mechanism for retarding the movement thereof in either direction.

2. In a hydrocarbon motor in combination, a gasolene pressure relief valve, comprising a spring pressed valve stem normally closing the gasolene pressure supplying system and a dash pot for retarding the movement of said stem in either direction.

3. A valve mechanism comprising a valve casing and a spring pressed valve stem therein, said valve having a valve stem mounted thereon, a fluid filled dash pot below said valve casing into which said valve stem extends and means on said stem within said dash pot to regulate the movement of the valve.

4. A valve mechanism comprising a valve casing and a spring pressed valve therein said valve having a valve stem mounted thereon, a fluid filled dash pot below said valve casing, a plate mounted on said dash pot, a spring seated on said plate and engaging the under part of the valve, an opening in said plate through which said valve stem passes into said dash pot and washers on said stem within said dash pot adapted to press against the fluid therein and retard the movement of said valve in either direction.

5. A valve mechanism comprising a valve casing having a valve seat, a valve in said casing adapted to coöperate with said seat, a casing detachably joined to said valve casing, a plate resting on said second named casing, a spring supported by said plate and bearing against said valve to hold it to its seat, and means for adjusting the position of said second casing on said valve casing, thus raising and lowering said plate and controlling the tension of the valve spring.

6. A valve device comprising a valve casing having a valve seat and a relief port therein, a valve in said casing adapted to coöperate with said seat and with said port, a spring for holding said valve to its seat, said valve being adapted to be moved from its seat against the action of said spring and to uncover said port, and a dash pot adapted to regulate the operation of said valve.

7. A valve device comprising a valve casing have a valve seat and a relief port therein, a valve in said casing adapted to coöperate with said seat and with said port, a spring for holding said valve to its seat, said valve being adapted to be moved from its seat against the action of said spring and to uncover said port, and a dash pot connected to said valve and adapted to quiet its closing action.

8. A valve device comprising a valve casing having a valve seat, a valve in said casing adapted to coöperate with said seat, a spring for holding said valve to its seat, said valve being adapted to be moved from its seat against the action of said spring, and a dash pot below and connected to said valve casing and adapted to quiet its closing action.

9. A valve device comprising a casing having a relief port therein, a valve in said casing adapted to coöperate with said relief port, a spring for holding said valve in position to cover said port, said valve being adapted to be moved against the action of said spring to uncover said port, and a dash pot below and connected to said valve casing and adapted to regulate its covering and uncovering action.

In testimony whereof I affix my signature.

JESSE G. VINCENT.